(No Model.) 3 Sheets—Sheet 1.

H. N. GALE.
BALL BEARING TROLLEY PULLEY.

No. 569,631. Patented Oct. 20, 1896.

Witnesses
Andrew Ferguson
Frank C. Healy

Inventor
Herbert N. Gale
By W. E. Simonds
Attorney.

(No Model.) 3 Sheets—Sheet 2.
H. N. GALE.
BALL BEARING TROLLEY PULLEY.

No. 569,631. Patented Oct. 20, 1896.

Witnesses
Andrew Ferguson
Frank P. Healy

Inventor
Herbert N. Gale
By W. E. Simonds
Attorney.

(No Model.)  3 Sheets—Sheet 3.
H. N. GALE.
BALL BEARING TROLLEY PULLEY.

No. 569,631. Patented Oct. 20, 1896.

Witnesses
Andrew Ferguson,
Frank P. Healy

Inventor
Herbert N. Gale
By W. E. Simond
Attorney.

UNITED STATES PATENT OFFICE.

HERBERT N. GALE, OF BRISTOL, CONNECTICUT.

BALL-BEARING TROLLEY-PULLEY.

SPECIFICATION forming part of Letters Patent No. 569,631, dated October 20, 1896.

Application filed July 14, 1896. Serial No. 599,084. (No model.)

*To all whom it may concern:*

Be it known that I, HERBERT N. GALE, a citizen of the United States of America, residing at Bristol, in the county of Hartford and State of Connecticut, have invented a certain new and useful Improvement in Ball-Bearing Trolley-Pulleys, of which the following is a description, reference being had to the accompanying drawings, wherein—

Figure 1:
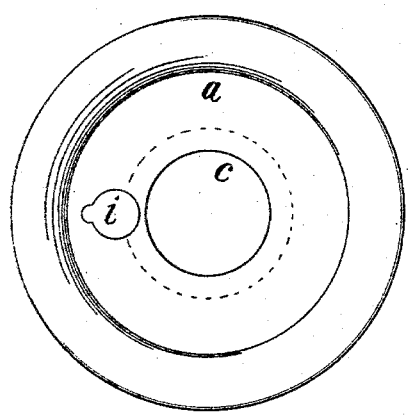
Figure 2:
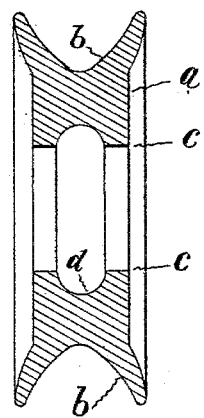
Figure 3:
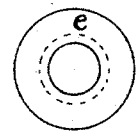
Figure 4:
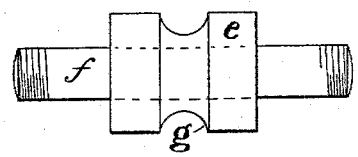
Figure 5:
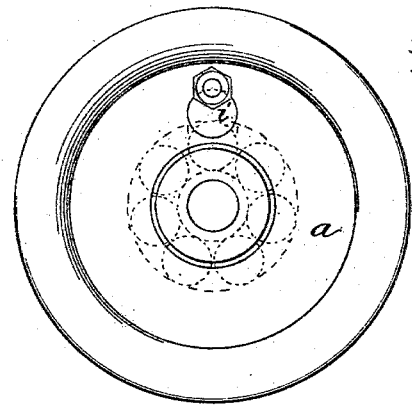
Figure 6:
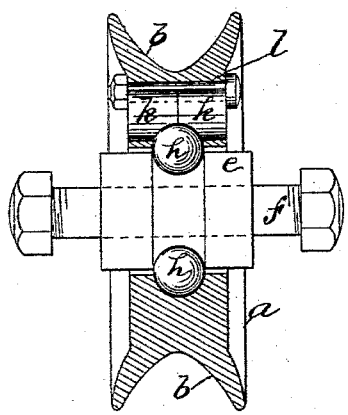
Figure 7:
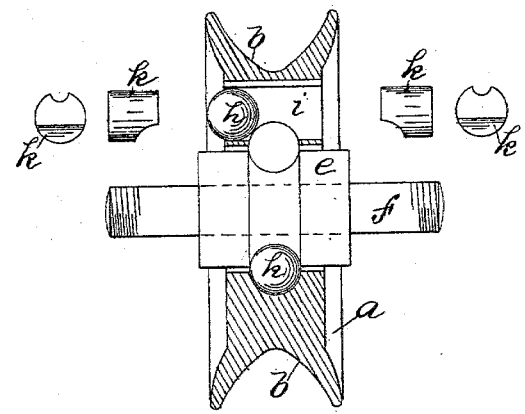
Figure 8:
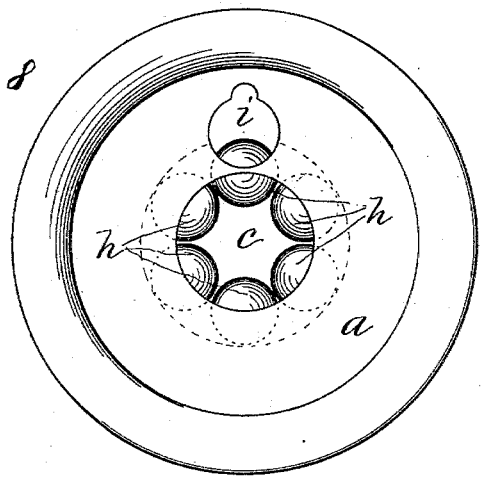
Figure 9:
Figure 9:
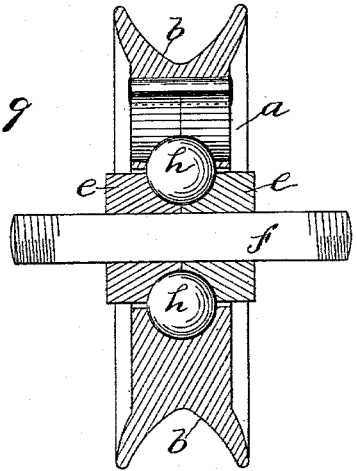

Figure 1 is a side view of the pulley-body. Fig. 2 is a view of the pulley-body shown in Fig. 1 represented as cut in central vertical section. Fig. 3 is an end view of the hub and central shaft of the same. Fig. 4 is a side view of the parts shown in Fig. 3. Fig. 5 is a side view of the complete structure with certain interior parts shown in dotted lines. Fig. 6 is a view of the parts shown in Fig. 5 represented as in the main cut in central vertical section. This figure includes nuts on the end of the central shaft which are not shown in Fig. 5. Fig. 7 is a view similar to Fig. 6, intended more especially for showing how the balls are fed or supplied into place, and the ball-confiners are shown separately both in side and end view. Fig. 8 is a side view of the pulley-body and the balls with the ball-confiners shown in end view separately. Fig. 9 is a view in central vertical section. It shows one feature additional to those shown in the other figures.

The object of the improvement is indicated by its title, that object being the production of a ball-bearing trolley-pulley.

In the accompanying drawings the letter *a* denotes the pulley-body. It contains or embodies exteriorly and peripherally the line-wire trough *b*. Its middle part is pierced by the central opening *c*, and the wall of this central opening contains the ball-trough *d*.

The letter *e* denotes the hub of the pulley, and *f* denotes the shaft bearing that hub. Said hub bears exteriorly the ball-trough *g*. The letter *h* denotes the balls, which when the parts are assembled are contained in and bear against both of said ball-troughs. These balls are fed or supplied to place through the ball-supply orifice *i*, and they are confined in place by the ball-confiners *k*, which in turn are held in place by the key *l*, preferably a headed bolt bearing a nut on the end.

Fig. 9 shows the hub as made in two corresponding halves. When so made, they may be held to place either by nuts bearing against their outer ends or by the forks of the trolley-pole or in any other convenient way.

I claim as my improvement—

The herein-described pulley for trolleys, consisting of the pulley-body having the exterior line-wire trough, the interior ball-trough, the ball-supply orifice, and the ball-confiners, in combination with the hub grooved exteriorly to form the ball-trough, and the pulley-shaft bearing the said hub, all substantially as and for the purpose set forth.

HERBERT N. GALE.

Witnesses:
W. E. SIMONDS,
ANDREW FERGUSON.